United States Patent
Belinski

(10) Patent No.: US 9,477,443 B1
(45) Date of Patent: Oct. 25, 2016

(54) METHOD AND APPARATUS OF ENTROPY SOURCE WITH MULTIPLE HARDWARE RANDOM NOISE SOURCES AND CONTINUOUS SELF-DIAGNOSTIC LOGIC

(71) Applicant: Andrian Belinski, Maple Grove, MN (US)

(72) Inventor: Andrian Belinski, Maple Grove, MN (US)

(73) Assignee: TECTROLABS L.L.C., Maple Grove ( * ) Notice: Subject to any disclaimer, the term of this patent is extended or adjusted under 35 U.S.C. 154(b) by 340 days.

(21) Appl. No.: 14/287,148

(22) Filed: May 26, 2014

(51) Int. Cl.
*G06F 17/10* (2006.01)
*G06F 7/58* (2006.01)

(52) U.S. Cl.
CPC .................................... *G06F 7/588* (2013.01)

(58) Field of Classification Search
CPC ....................................................... G06F 7/588
USPC ................................................ 708/250–256
See application file for complete search history.

(56) References Cited

U.S. PATENT DOCUMENTS

| 5,778,069 A | 7/1998 | Thomlinson et al. |
| 6,253,223 B1 | 6/2001 | Sprunk |
| 6,571,263 B1* | 5/2003 | Nagai ................... H04L 9/0861 708/255 |
| 7,962,539 B2 | 6/2011 | Barak et al. |
| 8,155,321 B2 | 4/2012 | Devanand et al. |
| 8,200,727 B2 | 6/2012 | Betouin et al. |
| 8,234,322 B2 | 7/2012 | Saito |
| 8,443,022 B2 | 5/2013 | Vasyltsov et al. |
| 8,522,065 B2 | 8/2013 | Regev et al. |

\* cited by examiner

*Primary Examiner* — Tan V. Mai

(57) ABSTRACT

A random number generating apparatus and method for generating on-demand random values using multiple hardware random noise sources; multiple analog-to-digital converters (ADC) for converting analog electrical signals into random digital values; a unit for selecting the random digital values and producing low bias random bytes; a unit for reducing bias and producing true random bytes; a continuous self-diagnostic logic (CSDL) for monitoring the health of the random noise sources and the quality of the generated random numbers.

10 Claims, 4 Drawing Sheets

METHOD AND APPARATUS OF ENTROPY SOURCE WITH MULTIPLE HARDWARE RANDOM NOISE SOURCES AND CONTINUOUS SELF-DIAGNOSTIC LOGIC

CROSS-REFERENCE TO RELATED APPLICATIONS

This application claims the benefit of provisional patent application Ser. No. 61/831,708, filed Jun. 6, 2013 by the present inventor.

BACKGROUND OF THE INVENTION

Random number generation involves the use of a program or device referred to as a random number generator (RNG) to generate a set of numbers that lack any discernible pattern and therefore are referred to as "random." Just how random, and therefore how unpredictable, these random numbers are, varies from generator to generator.

People have relied on randomness for thousands of years. In modern times, the use of random number generation has spread to numerous fields. In science, random numbers are used to create simulated data for economic models, climate change models, hurricane models, and even epidemiologist models. From simple models predicting the result of a number of coin tosses, to complex models simulating neutron transportation in nuclear fission, random numbers often play an important role.

Random number generation is monumentally important in data security and encryption. Random number generators are used to create encryption keys, salts, and keyfiles for keeping data safely encrypted. Random number generation is also needed for lottery management systems and other random drawings. In some cases, unbiased random number generation may be required by law, such as in random drug testing.

Some number generators used today are not actually random and rely solely on computer algorithms to generate sequences of numbers that appear random. These are called pseudorandom number generators (PRNGs). They produce sets of numbers from mathematical formulas that may appear to be random, but are actually periodic. If the starting point of a sequence is known, the exact same set of numbers can be generated over and over again. PRNGs are highly efficient, meaning they are able to produce large quantities of numbers quickly, but are by nature periodic and deterministic.

Some random number generators that are known as true random number generators (TRNGs) use physical phenomena to generate sets of numbers. These generators do not rely solely on mathematical formulas. Instead, they generate random numbers by measuring things such as variations in a user's mouse movement, atmospheric noise, electrical noise, or even radioactive decay. TRNGs are often used to generate private/public keys used in encrypted data communications or to provide the starting seeds for feeding PRNGs. The quality of the random numbers generated by TRNGs is therefore very important.

There are methods and algorithms, known in the art, for testing the quality of the random bytes produced by TRNGs that are included in software application testing suites such as the Diehard battery of statistical tests', Dieharder tests', Statistical Test Suite by NIST and others. Some of those require a computation power that may not be available in TRNGs and are used for testing the quality of TRNGs in off-line mode or during the manufacturing phase.

Another problem with the classical approach for testing TRNGs is that such statistical tests may often fail to unveil the failures of the random noise sources or deviations from the intended behavior as a result of external factors present, such as strong intentional (or unintentional) electromagnetic fields. Therefore, it becomes critical for a TRNG to not only produce high quality random data, but to also contain features that continuously monitor the quality of the generated random bytes and diagnose the health of the noise sources in real time. Such a health check test mechanism should ensure the quality and reliability of the TRNG devices in real time during their use or during manufacturing and design phases.

SUMMARY OF THE INVENTION

The present invention overcomes the problems described above, and provides additional advantages by providing a method and apparatus for generating high quality true random numbers based on multiple hardware random noise sources with continuous self-diagnostic logic (CSDL) to ensure the quality of the generated random numbers and the reliability of the apparatus.

According to an aspect of the invention, a random number generator (RNG) is provided for generating random numbers, the generator may include: multiple analog electrical circuit units generating random electrical noise; multiple analog-to-digital converter (ADC) units for transforming analog electrical signals into random digital values; a digital processing unit for selecting the random digital values and producing low bias random numbers; a bias reducing unit reducing the bias of the final random digital values; and a continuous self-diagnostic logic (CSDL) unit monitoring the quality of the generated random bytes and the health of the random noise sources.

According to another aspect of the invention, an analog electronic circuit unit is provided for generating random electrical noise, the circuit may include: a random noise circuit; a low-pass filter circuit; and an amplifier circuit. The provided electronic circuit unit is made out of inexpensive components and it doesn't require any tune-up or adjusting steps during the manufacturing phase or over its lifetime.

According to another aspect of invention, a method for generating random numbers is provided. The method includes the steps of: running the start-up tests that check the health of the random sources and the quality of generated random bytes; receiving requests for generating random bytes; sampling each random source and transforming analog voltage values into digital random values; running pre-processing tests on digital random values to check the health of the random sources; producing a low bias random byte stream by selecting the digital random values and applying logical operations; reducing bias of the resulted random bytes by applying a conditioning operation with one of the keyed or un-keyed conditioning functions; running post-processing tests that check the quality of the final random bytes; sending out the final random bytes.

DETAILED DESCRIPTION

The following is a detailed description of the present invention of an improved apparatus and method for generating true random numbers. The presented random number generator (RND) may be embodied in a portable device attached to a notebook, desktop computer, or hand held device, or it may be embedded into computing systems for the purpose of generating true random numbers.

Figure 1:
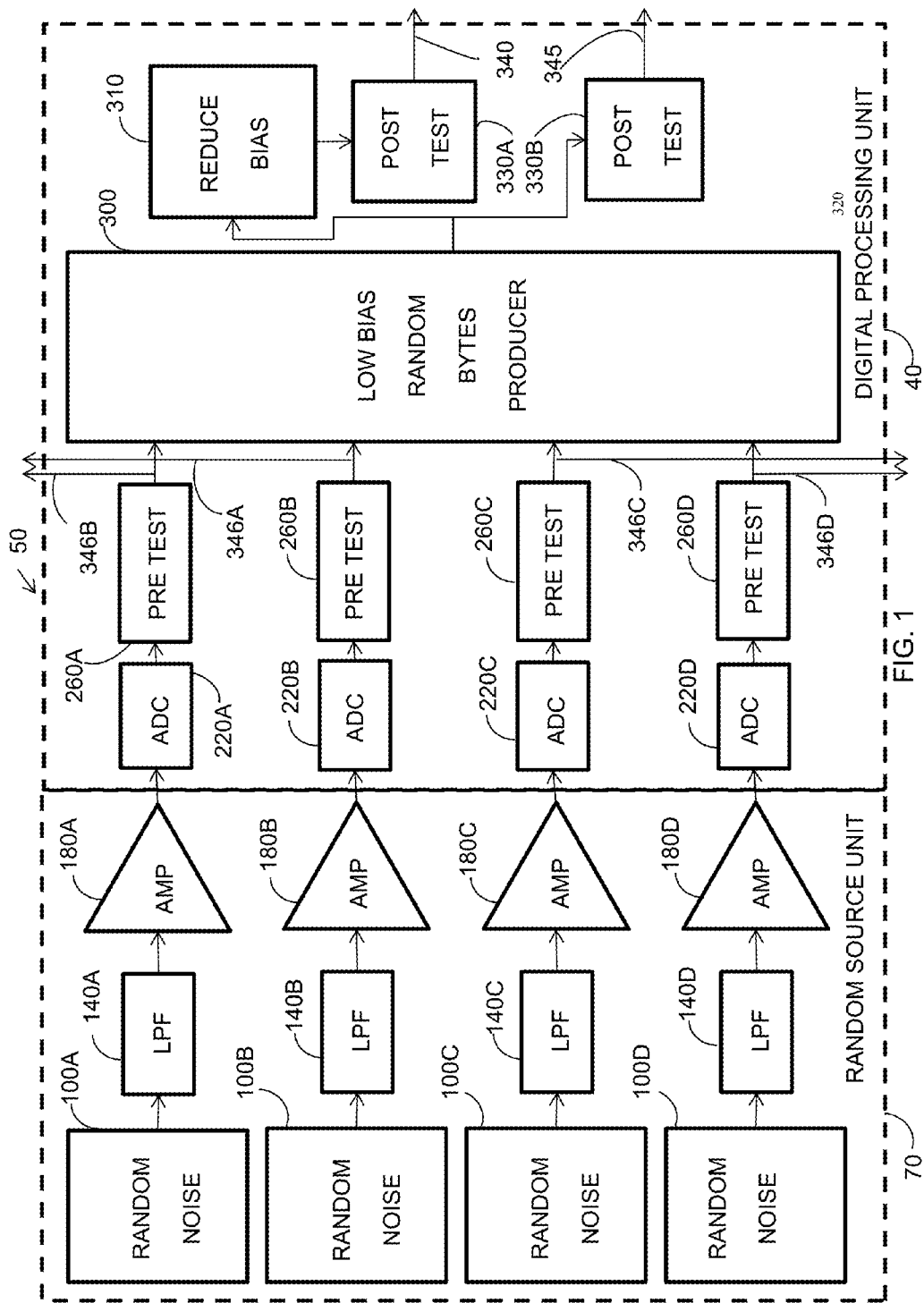
FIG. 1 contains a schematic representation of the random number generator (RNG) in accordance with the invention.

FIG. 1 shows the general structure of the presented RNG 50 according to some embodiments of the current invention and comprises of a random source unit (RSU) 70 and a digital processing unit (DPU) 40.

The RSU 70 contains analog electrical components used for generating random electrical noises and includes independent random noise elements 100A, 1008, 100C and 100D, connected respectively to low-pass filter (LPF) elements 140A, 140B, 140C and 140D, connected respectively to amplifier (AMP) elements 180A, 180B, 180C and 180D. Random noise units 100A, 1008, 100C and 100D are analog electronic circuits that generate random electronic signals from a physical process such as thermal noise, avalanche noise generated from an avalanche diode, Zener breakdown noise from a reverse-biased Zener diode or other quantum phenomena that tend to be random. LPF elements 140A, 140B, 140C and 140D are used to lower the bias by reducing the high noise frequencies. AMP elements 180A, 180B, 180C and 180D are used to amplify random analog signals to a value suitable for converting into digital value. The preferred implementation of RSU 70 includes four such independent interconnected elements, although a different number can also be used for implementations.

The DPU 40 may be partially or completely implemented using a microcontroller unit (MCU), a central processing unit (CPU) or may be embedded in other digital or computing devices. It comprises of analog-to-digital conversion (ADC) elements 220A, 220B, 220C and 220D, pre-test elements 260A, 260B, 260C and 260D, a low bias random bytes producer (LBRBP) 300, a bias reducer element 310 and post-test elements 330A and 330B. ADC elements 220A, 220B, 220C and 220D are used to convert independent analog random signals into raw digital random values. Pre-test elements 260A, 260B, 260C and 260D are part of continuous self-diagnostic logic (CSDL) and used for monitoring the health of the random noise sources by inspecting all generated 8 bits digital values and looking for anomalies such as missing values within a predetermined amount of consecutive bytes. The monitoring logic will detect failures of the random noise sources or deviations from the intended behavior. The output from pre-test elements 346A, 346B, 346C and 346D are connected to LBRBP element 300. The output lines 346A, 346B, 346C and 346D may be used for extracting and feeding raw random bytes to external systems for additional testing and diagnostics or when a different processing logic is desired. The LBRBP 300 generates low bias bytes by applying XOR (exclusive OR) or other logical or mathematical operations between 2 or more raw random bytes produced by different random noise sources.

According to some embodiments of the current invention, the DPU 40 may contain a bias reducer 310 for further reducing the bias of the random bytes. The bias reducer 310 comprises a conditioning component with one of the keyed or un-keyed conditioning functions approved by the National Institute of Standards and Technology, as described by NIST DRAFT Special Publication 800-90B August 2012, document section 6.4.2. The SHA-256 hashing function is a preferred implementation for such conditioning used in this RNG; however, other NIST approved conditioning function may be used. The output random byte stream from the bias reducer 310 is fed into post-test 330A, which is part of the continuous self-diagnostic logic (CSDL) and ensures the quality of the generated random bytes. The output line 340 is used for extracting and feeding the true random bytes RNG to the external system.

According to some embodiments of the current invention, the DPU 40 may contain a post-test 330B element connected directly to the LBRBP 300. The post-test 330B is part of the continuous self-diagnostic logic (CSDL) and is used for testing the quality of the low bias random bytes produced when feeding the external system. The output line 345 may be used for feeding the low bias random bytes directly to the external system, where conditioning logic is to be performed.

Figure 2:
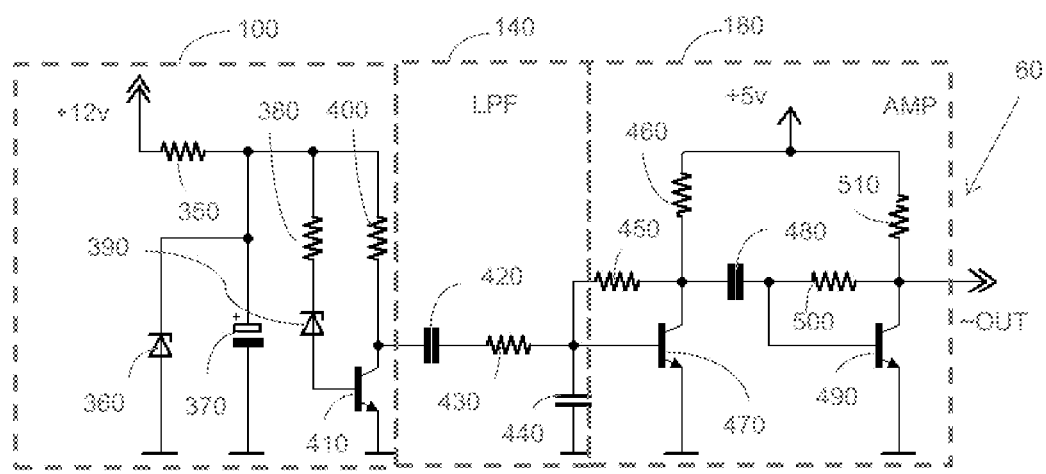
FIG. 2 contains electronic circuit schematics of a random noise source (RNS) unit in accordance with the invention.

FIG. 2 shows the electronic circuit of the random noise source (RNS) unit 60 according to some embodiments of the current invention and comprises of a random noise 100 based on a Zener diode, a low-pass filter 140 and an amplifier 180. The provided electronic circuit 60 is made out of inexpensive components and doesn't require any tune-up or adjusting steps during the manufacturing phase or over its lifetime.

Figure 4:
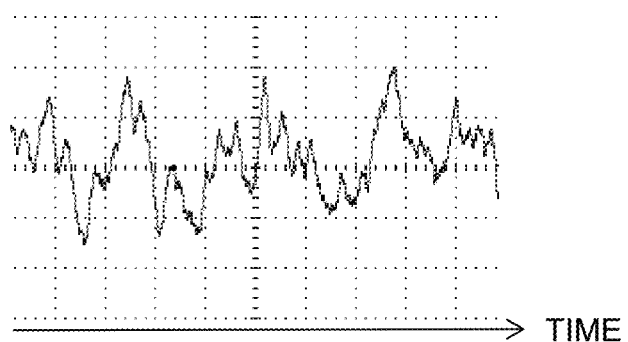
FIG. 4 contains an exemplary plot of a random electrical analog signal that is filtered and amplified.

The random noise unit 100 is powered by a 12 Volt direct current (DC) source. Resistor 350, Zener diode 360, and capacitor 370 form a shunt regulator to regulate the voltage across the random noise circuit. Resistor 380, resistor 400, Zener diode 390, and transistor 410 form the circuit that generates the random electrical noise. Capacitor 420 decouples the random noise circuit from the low-pass filter 140, which implements an RC filter based on resistor 430 and capacitor 440. The amplification circuit 180 is powered by a 5 Volt DC source and contains a two stage amplifier implemented on 470 and 490. The first stage is implemented on resistor 450, resistor 460 and transistor 470. The second stage is implemented on resistor 500, transistor 490 and resistor 510. Capacitor 480 is used for DC decoupling between those two amplification stages. It is believed that the nominal values of the electronic component that are specified below are best for this electronic circuit, but other nominal values and types may be used. Resistors 510, 500, 460 and 450 are 10K, resistors 350 and 430 are 150 Ohm, resistor 400 is 1.2K, and resistor 380 is 100K. Zener diode 360 is NTE5020A, Zener diode 390 is 1N5237B. Transistors 410, 470 and 490 are MMBT3904. Capacitor 370 is 22 uF, capacitors 420, 440 and 480 are 470 pF. The described electronic circuit is able to produce random analog electrical noise with a frequency at around 800 KHz. An exemplary plot of the random electrical analog signal generated by the electrical circuit described above is shown in FIG. 4.

Figure 3:
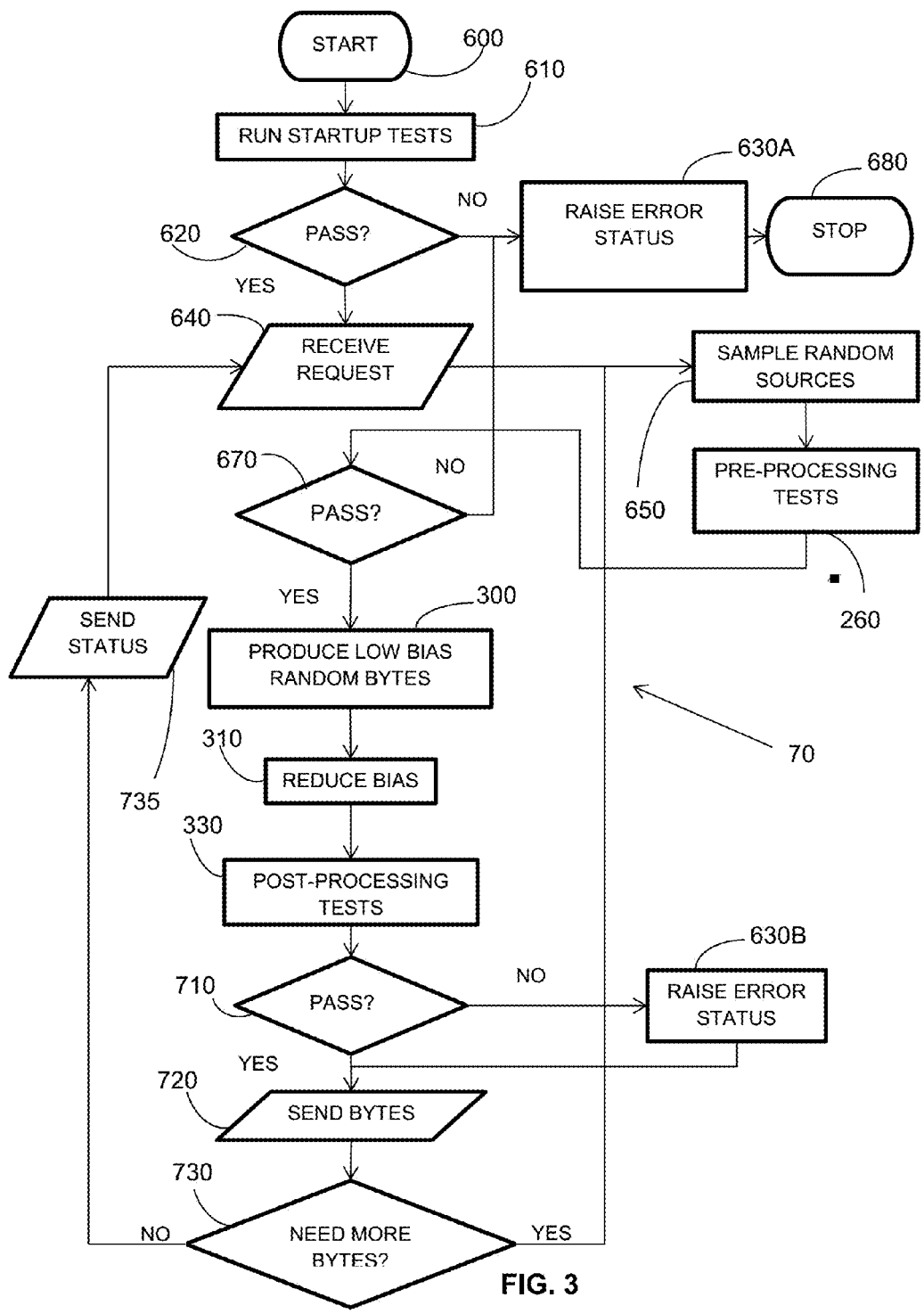
FIG. 3 contains a flow chart diagram of the method for generating on-demand true random bytes in accordance with the invention.

FIG. 3 is a flow chart describing the steps for generating on-demand high quality true random bytes in accordance with the present invention. The term "Software" used in the detailed description includes but is not limited to multiple computer instructions that can be compiled and executed using multiple processors and/or multiple microcontrollers. The various steps described below may be implemented using software programming languages such as C, C++, Assembly, Java and the like, by programmers with ordinary skills in the field. Some software steps may be implemented using operation systems (OS) such as Microsoft Windows, Apple OS X, Linux, UNIX types, or those used in embedded electronics devices. In FIG. 3 step 600 is used for starting the RNG device operation as a result of power start-up or reset condition. The purpose of step 610 is to detect failures or deviations from the intended behavior and check the quality of the random noise sources after the RNG device has started but before it is ready to accept requests. In this step the amplified analog signals from AMP elements 180A, 180B, 180C and 180D (FIG. 1) are sampled, and electrical values are converted into raw (unprocessed) random bytes using ADC elements 220A, 220B, 220C and 220D (FIG. 1) and stored in memory. It is believed that more than 100,000 samples per each random noise source should be performed for running the start-up tests, but higher number may be used. The generated raw random bytes are then used to build frequency tables, one table per random noise source. Each frequency table is then inspected by looking for zero or very low frequency values, which will indicate a failure of the corresponding random noise source. The same raw random bytes are used for performing 'Repetition Count' and 'Adaptive Proportion' health tests as specified by NIST DRAFT Special Publication 800-90B August 2012, document section 6.5. This step may also include execution of other steps mentioned in the flow chart in order to test other components of the RNG.

In step 620 (FIG. 3), if any start-up test failure is detected, an error status will be raised by step 630A. The RNG may, for example, use an audio signal or flashing light to indicate the error, or it may store the error status in internal memory. Step 680 will stop or shut down the RNG device so it won't accept any requests for generating random bytes when the error is detected. If all start-up tests have passed the check in step 620, the flow will enter step 640 and the RNG will wait to receive a request from the external system. The external system sends a request to the RNG, demanding a specific number of random bytes. When such a request is received, the flow enters step 650 and a new random number generation cycle begins. In this step, the amplified analog signals from AMP elements 180A, 180B, 180C and 180D (FIG. 1) are sampled and electrical values are converted into raw (unprocessed) random bytes using ADC elements 220A, 220B, 220C and 220D (FIG. 1) and stored in memory. The exact amount of samples performed will depend on the software implementation and specific ADC characteristics. The sampling process may be implemented asynchronously to speed up ADC conversion process so that the raw random bytes can be generated ahead of time and stored in memory independently. Step 260 (FIG. 3) is part of the CSDL implementation used for monitoring the health of the random noise sources by inspecting all generated raw random bytes and looking for anomalies such as missing values within a predetermined amount of consecutive bytes. This may be accomplished by storing a frequency table of the random bytes generated in step 650 for each noise source, and by periodically searching for zero or very low frequency values in those tables, which will indicate a failure of the corresponding random noise source.

In step 670 (FIG. 3), if any failure is detected during execution of the pre-processing tests, an error will be raised in step 630A and the flow will stop in step 680. But if no errors have been detected in step 670, the flow will enter step 300 for producing low bias random bytes by applying XOR (exclusive OR) or other logical or mathematical operations between 2 or more raw random bytes produced by different random noise sources. In step 310, the bias level of the produced random bytes is further reduced using one of the keyed or un-keyed conditioning functions approved by the National Institute of Standards and Technology as described by NIST DRAFT Special Publication 800-90B August 2012, document section 6.4.2. The SHA-256 hashing function is a preferred implementation for such conditioning used in this RNG, but other NIST approved hash function may be used. It is believed that 40 low bias random bytes as input are sufficient for SHA-256 hashing in order to produce an output of 32 true random bytes. In addition, a sequence number is appended to the hashing input as recommended by NIST in NIST DRAFT Special Publication 800-90B August 2012, document section 6.4.2.2. Step 330 is part of the CSDL implementation that takes additional steps to continuously monitor the quality of the generated random bytes by performing, but not limited to, 'Repetition Count' and 'Adaptive Proportion' health tests as specified by NIST DRAFT Special Publication 800-90B August 2012, document section 6.5. In step 710, if any post-processing test failure is detected, then an error status is raised in step 630B and the RNG will store the error status in internal memory and may, for example, use an audio signal or flashing light to indicate the failure condition. If all post-processing tests have passed the check in step 710, the flow will enter step 720 and the RNG will send the resulting true random bytes to the external system. In step 730, if more random bytes are needed to satisfy the request from the external system, then a new generation cycle will begin by entering step 650. Finally, when step 730 has verified that the requested amount of true random bytes has been sent, the execution will flow to step 735 and the current status code is sent to the external system. The status code is a variable stored in memory in steps 630A and 630B and indicates the RNG error code condition. The flow will enter step 640, and the RNG will enter waiting mode for receiving a new request from the external system and will be ready to start a new generation cycle.

What is claimed is:
1. A method for generating on-demand random numbers with multiple random noise sources and self-diagnostic logic, the method comprising the steps of:
running a set of startup tests checking the health and quality of the random noise sources and the quality of the generated random values;
if the startup tests pass, waiting to receive a request from the external system (ES);
receiving and validating the request from the ES;
sampling the random noise sources and converting electrical signals into independent random raw byte streams;
running pre-processing tests, continuously monitoring the health of the random noise sources;
if the pre-processing tests pass, producing a stream of low bias bytes by selecting the values from the independently generated random raw byte streams and applying a XOR (exclusive OR) logical operation between the selected bytes;
applying to the produced random bytes a keyed or un-keyed conditioning function approved by the National Institute of Standards and Technology, as described by NIST DRAFT Special Publication 800-90B August 2012, document section 6.4.2;
running post-processing 'Repetition Count' and 'Adaptive Proportion' health tests described by NIST DRAFT Special Publication 800-90B August 2012, document section 6.5;
if the post-processing tests pass, sending the generated random bytes to the ES; and if the amount of bytes sent to the ES satisfies the initial request, sending a random number generator (RNG) status health byte and returning to the step of receiving a request from the ES.

2. The method of claim 1, wherein if the startup tests fail, further comprising the steps of:
   raising the RNG internal error status, storing the RNG status health byte as the error code; and
   shutting down the RNG.

3. The method of claim 1, wherein if the pre-processing tests fail, further comprising the steps of:
   raising the RNG internal error status, storing the error code; and
   shutting down the RNG.

4. The method of claim 1, wherein if the post-processing tests fail, further comprising the steps of:
   raising the RNG internal error status, storing the error code; and
   following the step of sending the generated random bytes to the ES.

5. The method of claim 1, wherein if the amount of bytes sent to the ES doesn't satisfies the initial request, returning to the step of sampling the random noise sources.

6. The method of claim 1, wherein the conditioning function is SHA-1, SHA-2, SHA-3 or HMAC, described by NIST DRAFT Special Publication 800-90B August 2012, document section 6.4.2.

7. The method of claim 1, wherein the start-up tests comprising the steps of:
   storing in memory a periodically generated frequency table of the generated raw random bytes for each random source and looking for zero or very low frequency values; and
   generating random bytes by simulating ES requests and running 'Repetition Count' and 'Adaptive Proportion' health tests described by NIST DRAFT Special Publication 800-90B August 2012, document section 6.5.

8. The method of claim 1, wherein the pre-processing tests includes storing in memory a periodically generated frequency table of the generated raw random bytes for each random source and looking for zero or very low frequency values.

9. The method of claim 1, wherein the method is performed within a secure processing environment.

10. The method of claim 1, wherein the ES is a notebook, desktop computer, electronic device or computing system.

* * * * *